United States Patent [19]
Olson

[11] Patent Number: 6,105,477
[45] Date of Patent: Aug. 22, 2000

[54] LUMBER MILLING APPARATUS

[76] Inventor: Garry G. Olson, 1685½ Minear Rd., Medford, Oreg. 97501

[21] Appl. No.: 09/099,127

[22] Filed: Jun. 17, 1998

[51] Int. Cl.$^7$ ........................................................ B26D 7/00
[52] U.S. Cl. ................................. 83/167; 83/428; 83/471; 83/477.1; 83/477.2; 83/486; 83/928
[58] Field of Search .............................. 83/477, 433, 412, 83/485, 486, 158, 488, 477.1, 477.2, 471, 167, 928, 428, 732

[56] References Cited

U.S. PATENT DOCUMENTS

| | | |
|---|---|---|
| 2,722,954 | 11/1955 | Carver et al. . |
| 3,721,146 | 3/1973 | McManama . |
| 3,747,457 | 7/1973 | Thompson . |
| 4,078,460 | 3/1978 | Bowman . |
| 4,104,944 | 8/1978 | Janssen . |
| 4,148,344 | 4/1979 | Critchell et al. . |
| 4,262,572 | 4/1981 | Flodin . |
| 4,271,736 | 6/1981 | Jones ..................................... 83/412 X |
| 4,341,248 | 7/1982 | Critchell et al. . |
| 4,753,144 | 6/1988 | May . |
| 4,867,213 | 9/1989 | Bolton et al. .......................... 83/364 X |
| 5,036,738 | 8/1991 | May . |
| 5,109,899 | 5/1992 | Hendrickson ...................... 83/471.2 X |
| 5,249,491 | 10/1993 | Carter .................................... 83/365 X |
| 5,429,161 | 7/1995 | Allard ................................... 83/367 X |
| 5,819,622 | 10/1998 | Quick ................................... 83/412 X |

OTHER PUBLICATIONS

"The Portable Sawmill", *Lumber Manufacturing: The Design and Operation of Sawmills and Planer Mills*, Ed M. Williston, pp. 272–274.

*Primary Examiner*—M. Rachuba

[57] ABSTRACT

A portable sawmill is described that preferably includes a frame-mounted, elongate tub for surrounding a log, the frame mounting adjacent the base of the tub a lateral chain conveyor for rolling the log or advancing it laterally on a frame-mounted lift mechanism for elevating the log as it is ripped by an overhead set of circular saws. The circular saws are double-carriage mounted, with the carriages being a fixed elevation on the frame and with the main and secondary carriages being reciprocally positionable, respectively, along the length and width of the tub above the log. The circular saws preferably include one vertical-swath blade and two vertically separately elevation-adjustable horizontal-swath blades. To one side of the tub, and along the substantial length of the frame, are a plurality of retractable support arms mounted on the frame at a height approximately equal to the elevation of the lateral conveyor at the highest elevation of the lift mechanism. Logs may be lifted as they are processed, and cants produced by such processing may be lifted and moved laterally onto the support arms for further milling. The support arms are automatically retracted from a maximum inward extent to a incrementally, successively retracted position synchronously with lateral movement of the secondary carriage, at the beginning of each of successive passes of the main carriage, to prevent interference between the saw blades and the inward termini of the retractable arms. Structure for spindle-aligning logs, rotating partly squared logs and handling cants while finish milling lumber is described.

5 Claims, 17 Drawing Sheets

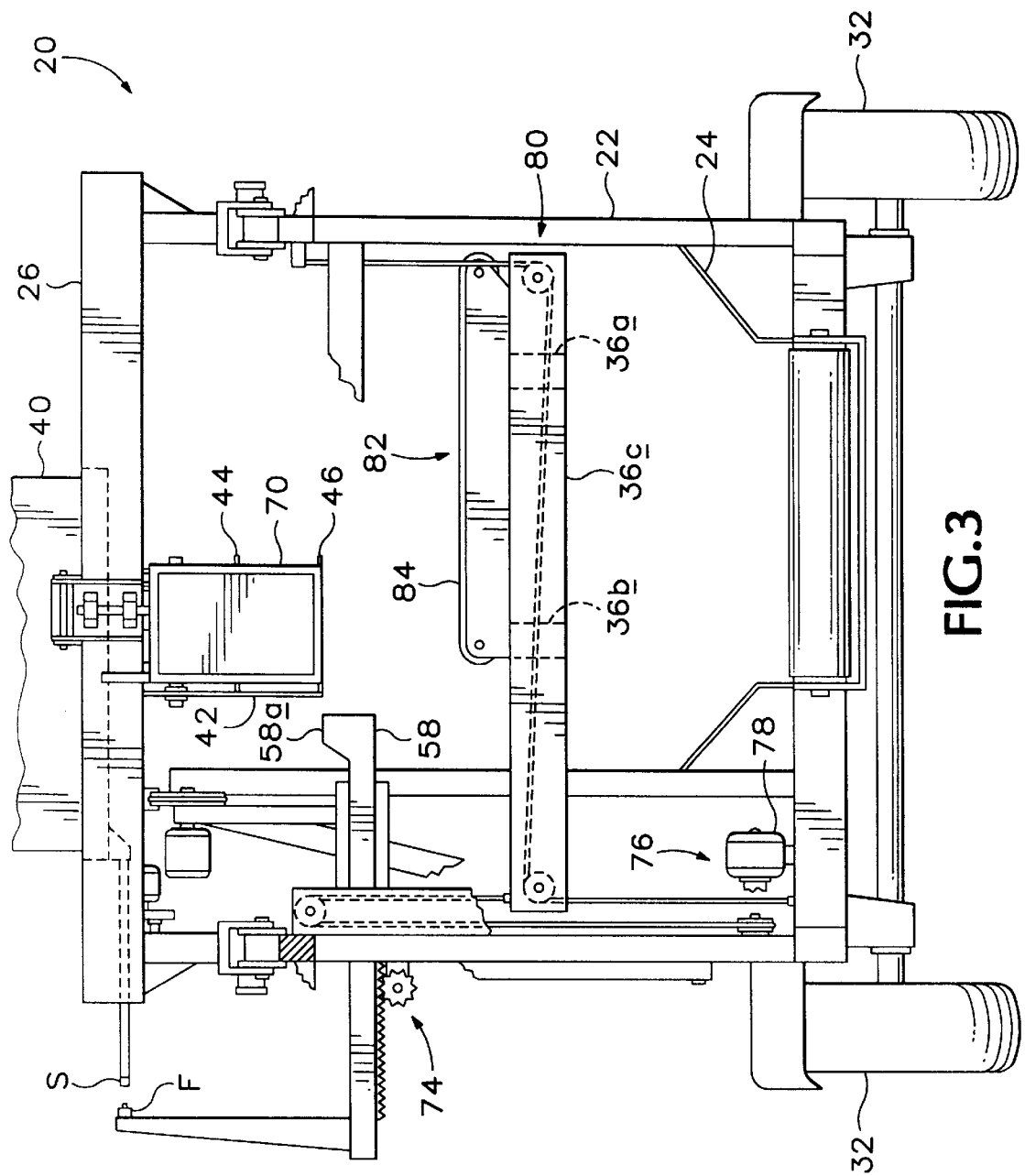

LUMBER MILLING APPARATUS

TECHNICAL FIELD

The present invention relates generally to portable sawmills. More particularly, it concerns a portable sawmill capable of producing a series of semi-automatic ripping cuts of logs having an extremely large range of diameters.

BACKGROUND ART

Conventionally, portable sawmills have enabled the milling of relatively small logs having diameters falling within a relatively narrow range. In other words, portable sawmills have been structured and dimensioned to favor one size log or a narrow range of log sizes, and have been unequipped to be of more general utility. One example of a prior art portable sawmill is as described and illustrated by Bowman in U.S. Pat. No. 4,078,460 entitled TIMBER MILLING APPARATUS. The sawmill described therein is mounted on a wheeled, mobile platform and provides a longitudinal and a transverse carnage mounting two saw blades that are orthogonally arranged relative to one another. In order to accommodate a larger diameter log, the saw support beams are frame mounted via vertical posts that are configured to permit manual height adjustment of the saw blades above the log-centering support conveyors.

Bowman does not address how to semi-automate the process of elevating the log to an appropriate height relative to the fixed height of the saw blades, thus seriously slowing the processing of logs widely variant in diameter. Bowman also provides no means to finish-rip dimensional lumber while supporting a cant on a support mechanism. Thus, Bowman fails to address the problem of performing through cuts in a cant that is being sawn, without cutting through to the surface of the log or cant support mechanism.

DISCLOSURE OF THE INVENTION

Briefly, the invented sawmill includes a frame-mounted, elongate tub for surrounding a log, the frame mounting adjacent the base of the tub a lift mechanism for elevating the log, the lift mechanism being operatively coupled with one or more lateral chain conveyors for rolling the log or advancing it laterally prior to the log being ripped by an overhead set of circular saws. The circular saws are double-carriage mounted with the carriages being at a fixed elevation on the frame and with the main and secondary carriages being reciprocally positionable, respectively, along the length and width of the tub above the log. The circular saws include one vertical-swath blade and two separately elevation-adjustable horizontal-swath blades. To one side of the tub, and along the substantial length of the frame, are a plurality of retractable support arms mounted on the frame at a height approximately equal to the elevation of the lateral conveyor at the highest elevation of the lift mechanism.

Logs may be lifted as they are processed, and cants produced by such processing may be lifted and moved laterally onto the support arms for further milling. The support arms are automatically retracted from a maximum inward extent to a fully retracted position synchronously with lateral movement of the secondary carriage, at the beginning of each of successive passes of the main carriage, to prevent interference between the saw blades and the inward termini of the retractable arms. This important feature enables the invented apparatus completely and optimally to mill a log of any of a wide range of diameters and lengths. Such may be done under the direction of a control panel and associated switches and wiring—which is entirely conventional and forms no part of the present invention—by a single operator thereof controlling carriage motion, horizontal saw blade height and lift elevation, and with retraction of the support arms occurring automatically. Thus, the invented sawmill operates semi-automatically in cooperation with the operator.

These and additional objects and advantages of the present invention will be more readily understood after consideration of the drawings and the detailed description of the preferred embodiment which follows.

BRIEF DESCRIPTION OF THE DRAWINGS

FIG. 3 is a rear elevation of the invented apparatus.

Figure 1A:
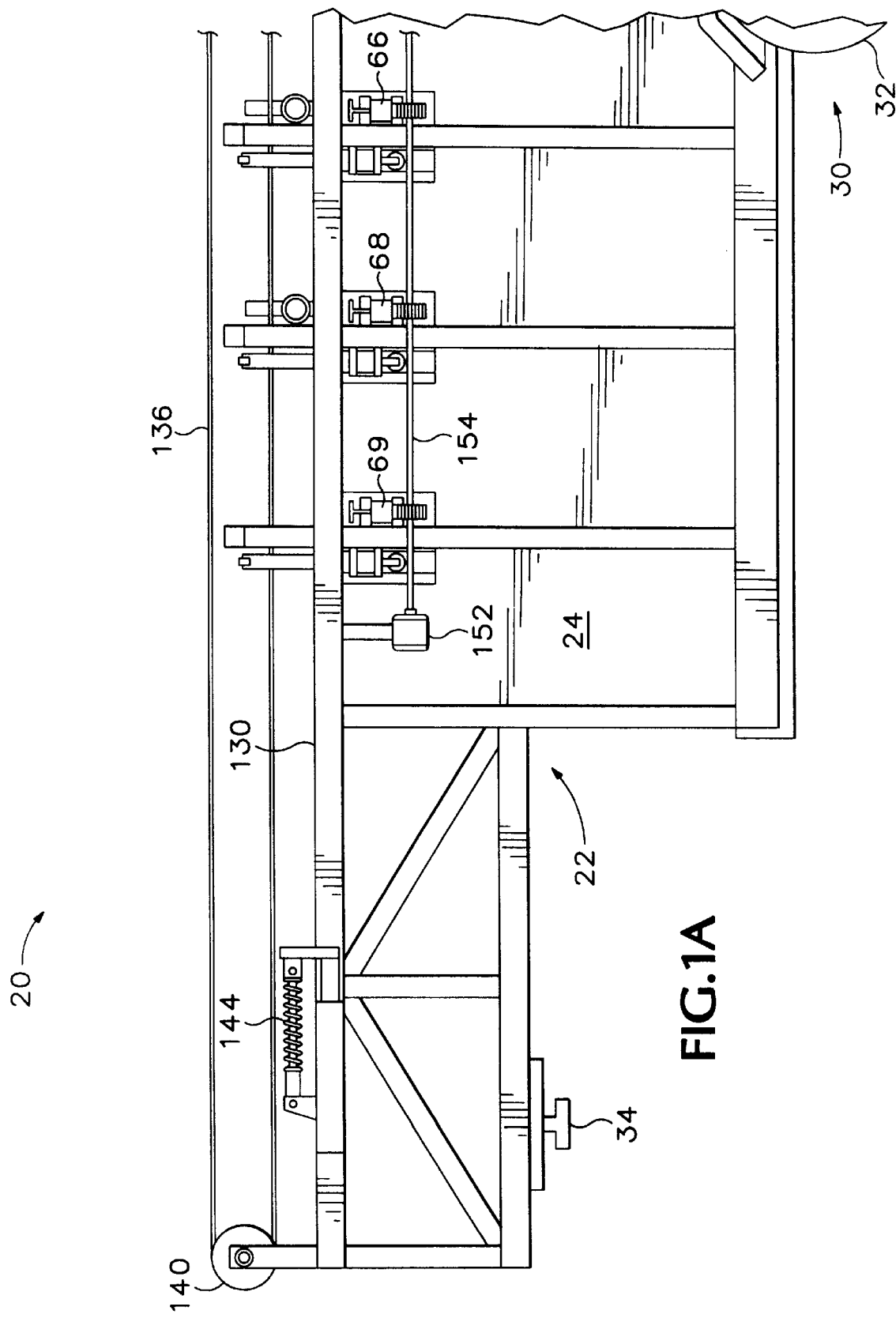
FIGS. 1A and 1B represent a side elevation of the apparatus made in accordance with the preferred embodiment of the invention.
Figure 1B:
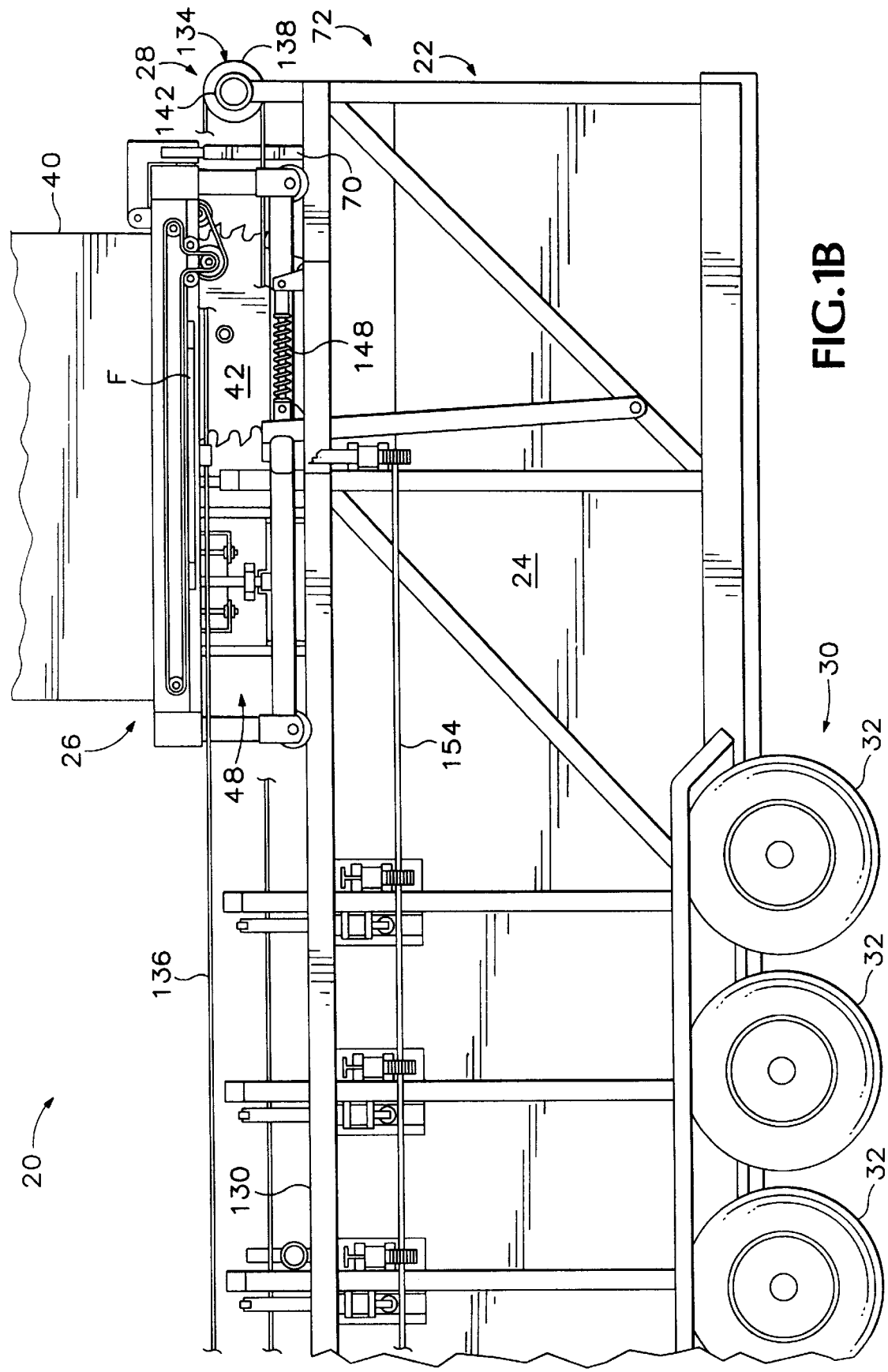

DETAILED DESCRIPTION OF THE PREFERRED EMBODIMENT AND BEST MODE OF CARRYING OUT THE INVENTION

The invention concerns a mobile sawmill capable of turning a succession of logs into ready-to-trim lumber of any desired cross-sectional dimensional variety, e.g. a mix of 2"×6", 2"×8", 4"×4", 1"×4", etc. pieces, in order to optimize either board foot or sale value yield. The mill includes a frame mounted preferably on a wheeled trailer for pulling of the mill behind a semi-truck to a milling site. The mill is self-contained, having a longitudinally movable main carriage mounting a preferably diesel engine and drive mechanics for three circular saws. The frame is compact, but encloses a log of virtually any size, e.g. from 6" diameter up to 48" diameter (or greater) and from 4' length up to 20' length (or longer), within a sturdy, square-tubular metal enclosure that permits the log to be manipulated for various carriage passes during the milling operation.

Referring collectively first to FIGS. 1A, 1B and 2A, 2B, apparatus 20 may be seen in side elevational and a corresponding top plan view, respectively. It will be appreciated that certain features intentionally are omitted from the side elevation shown in FIGS. 1A, 1B, for the sake of clarity.

Apparatus 20 preferably includes a longitudinal frame 22, preferably welded of square or rectangular tubular steel; a frame-mounted, preferably semi-cylindrical tub 24 of similar durable construction; and a first or main saw carriage 26 reciprocally movable fore-and-aft along frame 22 above tub 24 by a drive mechanism indicated generally at 28. Frame 22 may be seen to be generally right rectilinear, and preferably is mounted on a towable trailer 30 having plural wheels 32 and a conventional so-called fifth wheel-type hitch mechanism 34 for towing behind a conventional semi-trailer truck cab (not shown).

Larger logs such as log L shown in FIGS. 10A through 16 may be lifted within the confines of tub 24 by a preferably winch-driven lift mechanism indicated generally at 36 and rotated therein by one or more motor-driven lateral chain conveyors 38 to position and orient the log for a series of aft-to-fore milling passes of first carriage 26. First carriage 26 mounts a second, or secondary, laterally movable carriage 40 that fixedly mounts plural circular saws preferably including a first saw blade 42 (see FIG. 1B) of which is mounted in a primary vertical ripping orientation and at least one and preferably two other saw blades 44, 46 (see FIG. 2B) of which are mounted in a horizontal ripping orientation at independently adjustable elevations relative to primary saw blade 42. The vertical spacing between the pair of horizontal saw blades 44, 46 may be adjusted over a wide range between ⅞" and 14" by a horizontal saws-positioning mechanism indicated in FIG. 1B generally at 48.

Once a larger log is sawn to produce a smaller cant, the cant is conveyed onto a retractable, frame-mounted support mechanism 56 that extends along one side of frame 22. In accordance with the preferred embodiment of the invention, support mechanism 56 includes a plurality of ganged, retractable arms such as arms 58, 60, 62, 64, 66, 68, 69 (the first listed of which is not load-bearing, as will be explained) that extend in, thus defining, a plane that is substantially parallel with the plane of lift mechanism 36. This cant then is finished by moving second carriage 40 laterally into position to utilize the saws to rip the cant into finished lumber of any desired dimensional mix that is compatible with desired yield criteria. After lumber is sawn, first carriage 26 is returned to its original, rearward position as cut and separated, finished lumber pieces are pulled, or urged rearwardly by a gate 70 onto an exit support region 72 of frame 22 where they may be manually fed onto a conventional and preferably portable trimmer, for example, (not shown) for further downstream lumber processing.

Referring now to FIG. 3, frame 22, tub 24 and lift mechanism 36 may be seen in front elevation, along with other features to be described. It may be seen best from FIG. 3 that lift mechanism 36 preferably includes two longitudinal beams 36a, 36b (shown in phantom in FIG. 3 and in cross section in FIGS. 4 through 7) that are preferably substantially coextensive with frame 22 and a plurality e.g. two, of transverse members such as member 36c on either end of frame 22. It will be appreciated that members 36a, 36b and their associated conveyor mechanism(s) mounted thereby for elevation by lift mechanism 36 make up part of what will be referred to herein as a station, of which there are seven in accordance with the preferred embodiment, as will be seen.

Next, seen extending downwardly from secondary carriage 40 is swing gate 70 shown in its deployed, broadside pivotal position in front of horizontal saw blades 44, 46. It will be understood that gate 70 preferably is spring-loaded in the illustrated position, but will swing into an orthogonal, edge-ward position when it abuts a mass such as a log or processed lumber as main carriage 26 travels toward the front of apparatus 20 (typically when the apparatus is ripping lumber). Gate 70 thus urges cut, ready-to-trim lumber toward the rear of apparatus 20 into exit region 72 for further downstream processing upon the return of carriage 26 to its starting position. It may be seen by brief reference to FIG. 8 that gate 70 also may be pivotable out of the way entirely for maintenance or cleaning of apparatus 20.

Also shown in FIG. 3 is a hazard-avoidance feature of apparatus 20 that is unique to the front-most station corresponding with position-control retractor support arm 58. Position-control retractor support arm 58, which will be understood to not be load-bearing, may be seen to have an upwardly extending terminal shoulder 58a equipped with a trip wire (not visible at the scale of FIG. 3) that, if cut by vertical saw blade 42 due to a malfunction of apparatus 20, opens a circuit that forces a controlled shutdown of any forward motion of carriage 26 into the sawing region so as not to damage the vertical saw blade or any of the plural retractor support arms. It may be seen from FIG. 3 that the retractable support arms are extendable and retractable horizontally via a preferably rack-and-pinion drive indicated generally at 74 that is mechanically ganged with the other rack-and-pinion drives to a common hydraulic motor (not shown in FIG. 3, but shown in FIG. 2A and described below).

Referring still to FIG. 3, a winch 76 which preferably is used to operate lift mechanism 36 may be seen to include a hydraulic motor 78 and associated pulleys-and-cable drive subsystem terminating in frame-mounted posts (not visible in FIG. 3 but visible in FIGS. 4 through 7), indicated generally at 80. It will be appreciated that the elevation of lift mechanism 36 may be controlled very simply by actuating motor 78. The pulleys-and-cable drive subsystem 80 is duplicated at a second station adjacent the other end of frame 22, as indicated in the top plan view of FIG. 2A. It will be appreciated that the lift mechanisms at either end preferably include a planar log support region 82 preferably including some form of lateral chain conveyor 84 or 84' for laterally positioning a log supported thereby. Those skilled in the art will appreciate that the elevated horizontal beam shown only fragmentarily in FIG. 3 is at the extreme rear end of frame 22, and that there is another not shown at the extreme front end of frame 22, the beams being below the saw plane defined by main carriage 26, and secondary carriage 40.

Referring briefly collectively to FIGS. 4 through 7, which are cross-sectional rear elevations showing various features of apparatus 20, it will be appreciated that the front end cross member 36c that forms a part of lift mechanism 36 is visible at the far (front) end of apparatus 20.

Figure 4:
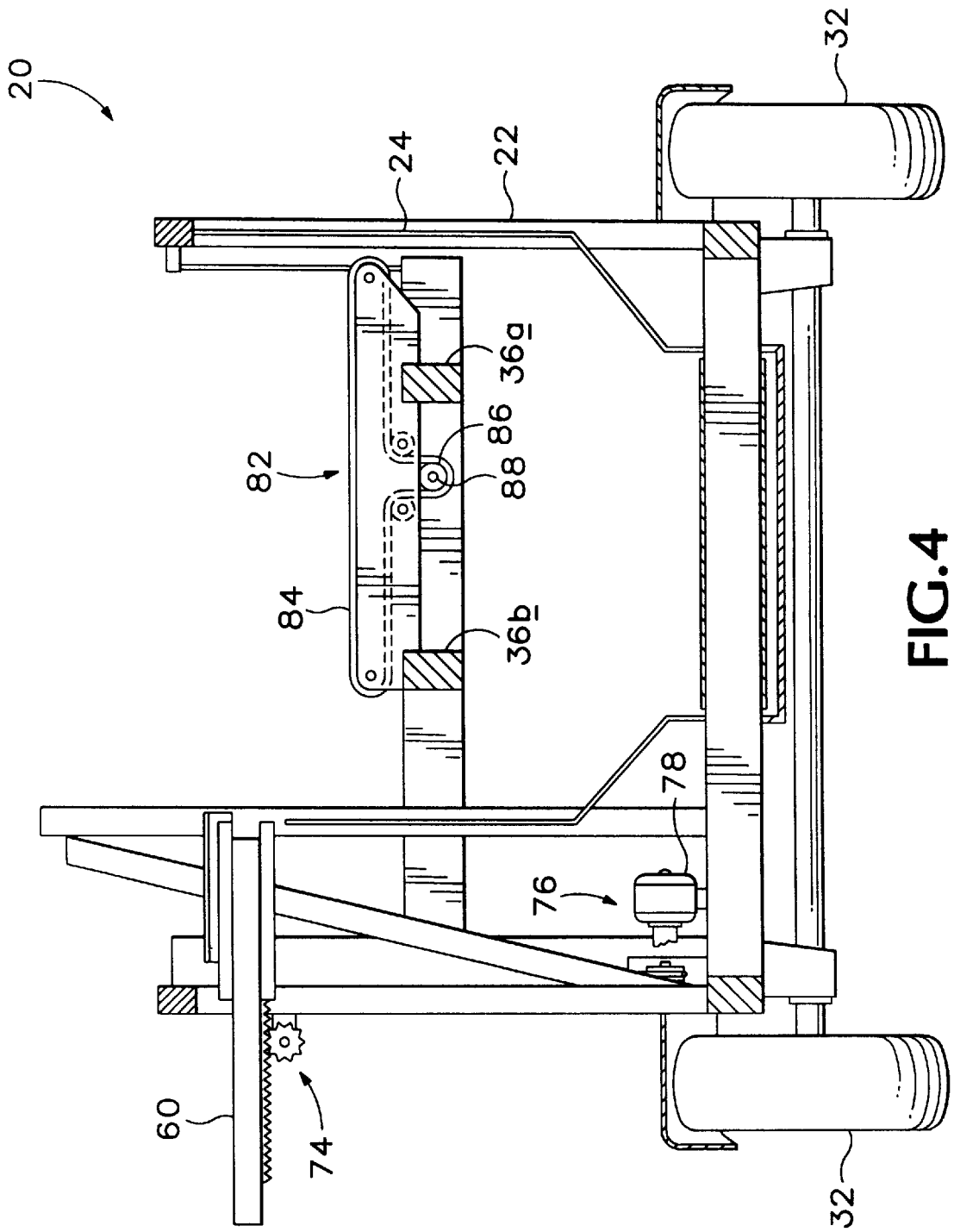
FIG. 4 is a rear cross-sectional view of the apparatus taken generally along the lines 4—4 in FIG. 2B.

FIG. 4 shows a second retractable cant support arm 60 of the non-positioning variety in its fully retracted position clear of the generally rectangular-cylindrical work region within frame 22. FIG. 4 perhaps better illustrates lateral chain conveyor 84, which may be of conventional structure as shown with a chain extending around a series of drive and plural idler sprockets. The conveyor's drive mechanism, including preferably a hydraulic motor 86 and a common drive shaft 88 may be understood by momentary reference to FIGS. 2A, 2B.

Figure 5:
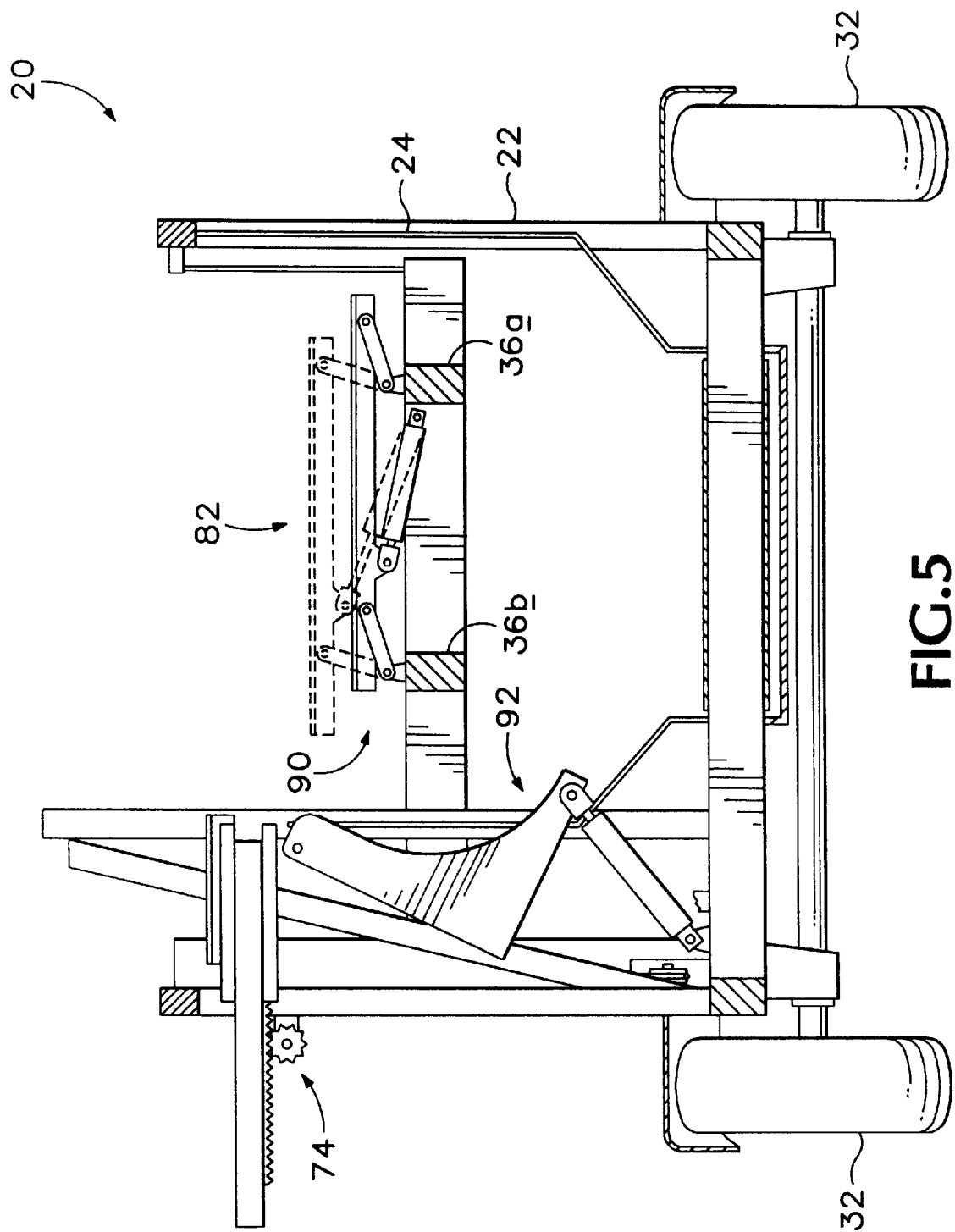
FIG. 5 is a rear cross-sectional view of the apparatus taken generally along the lines 5—5 in FIG. 2B.

FIG. 5 shows two further preferred features of the invention in cross section. A horizontal taper block is shown at 90, of which it will be understood that there may be any suitable number in any suitable frame-mounted arrangement along the longitudinal axis of apparatus 20. As will be seen, horizontal taper blocks 90 are preferably hydraulic cylinder driven to elevate, and to laterally move, a log supported on support region 82. Each of such horizontal taper blocks may be seen to include a parallelogram arrangement of pivotally linked members that define an arc traversed by an upper horizontal surface that supports the log. In accordance with the preferred embodiment of the invention, each horizontal taper block 90 has a throw of approximately 8", as indicated in phantom. It will be appreciated that the horizontal taper blocks are independently operable to selectively move one or more of them to elevate the tapered end of the log such that its spindle, or central longitudinal axis, is aligned with the long axis of apparatus 20.

Figure 2A:
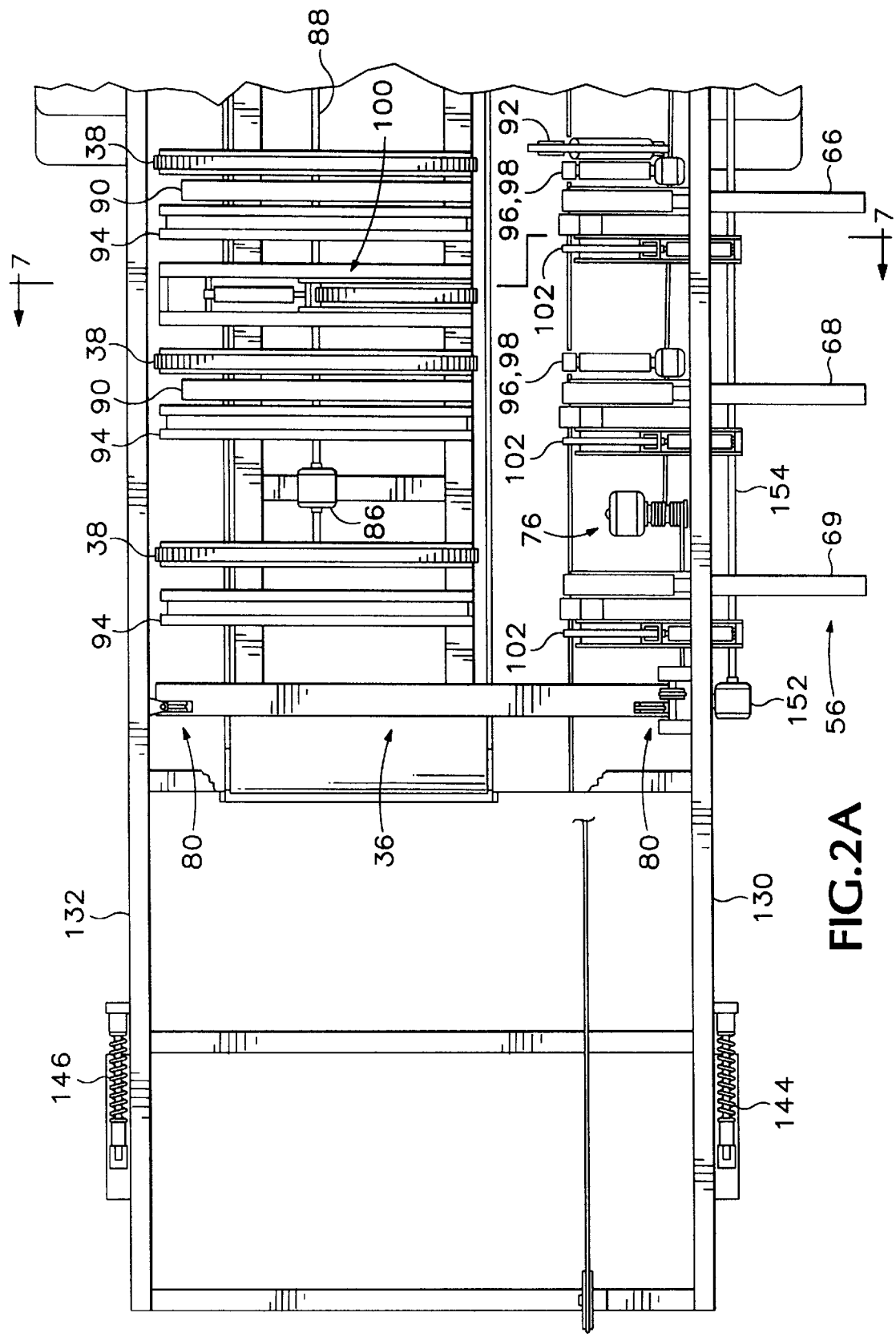
FIGS. 2A and 2B represent a top plan view of the invented apparatus corresponding with FIG. 1.
Figure 2B:
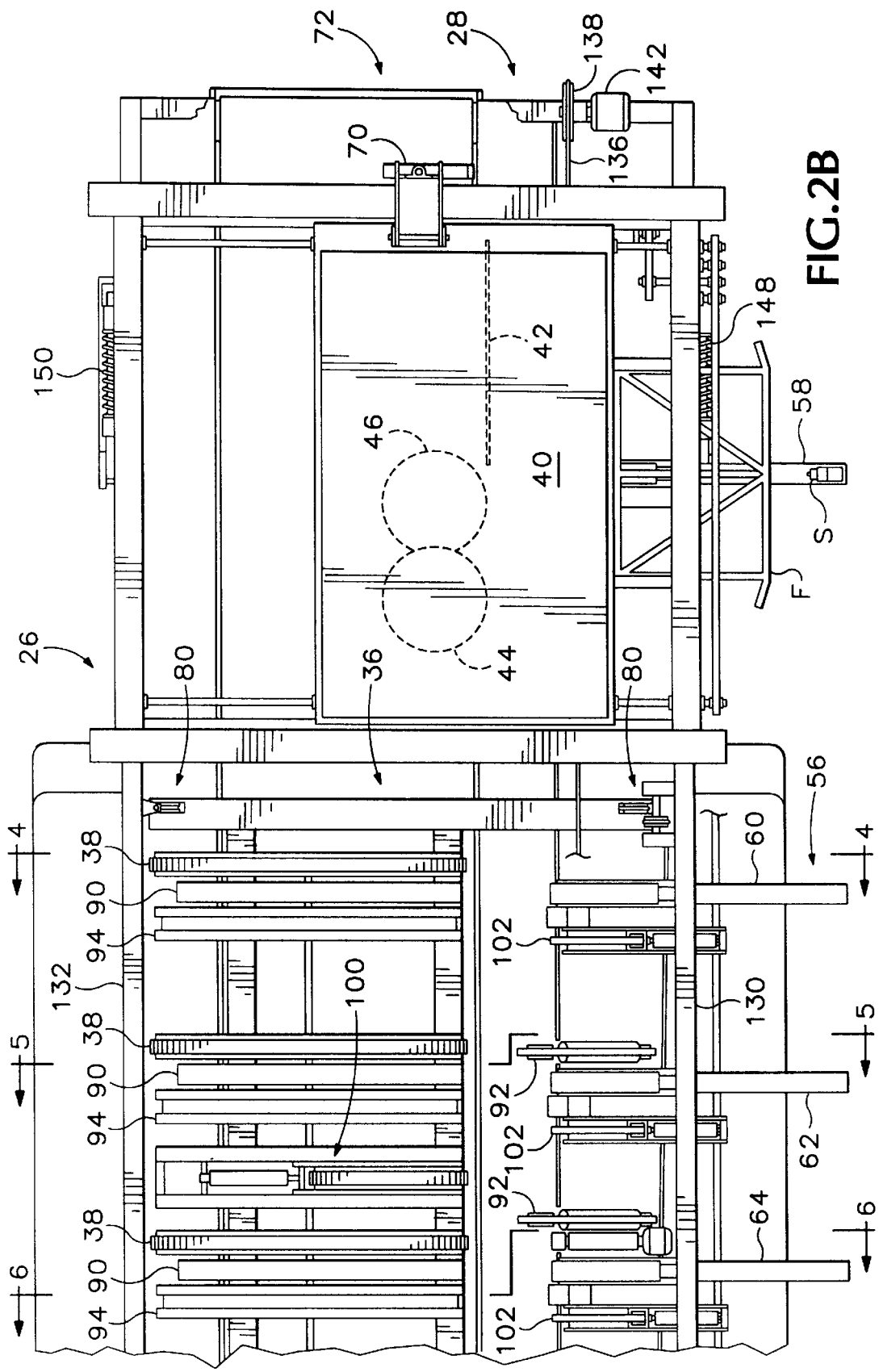

FIG. 5 also shows what will be referred to herein as a knee block 92, which as may be seen is preferably hydraulic cylinder driven to selectively pivot into and out of the central, ripping region of apparatus 20. There may be one or more at one or more knee blocks 92 of the stations positioned along the longitudinal axis of apparatus 20, as indicated in FIGS. 2A, 2B. The smoothly arced interior, or working, surface of knee block 92 may be understood to provide for the smooth control of a partly squared log during its rotation within apparatus 20.

Figure 6:
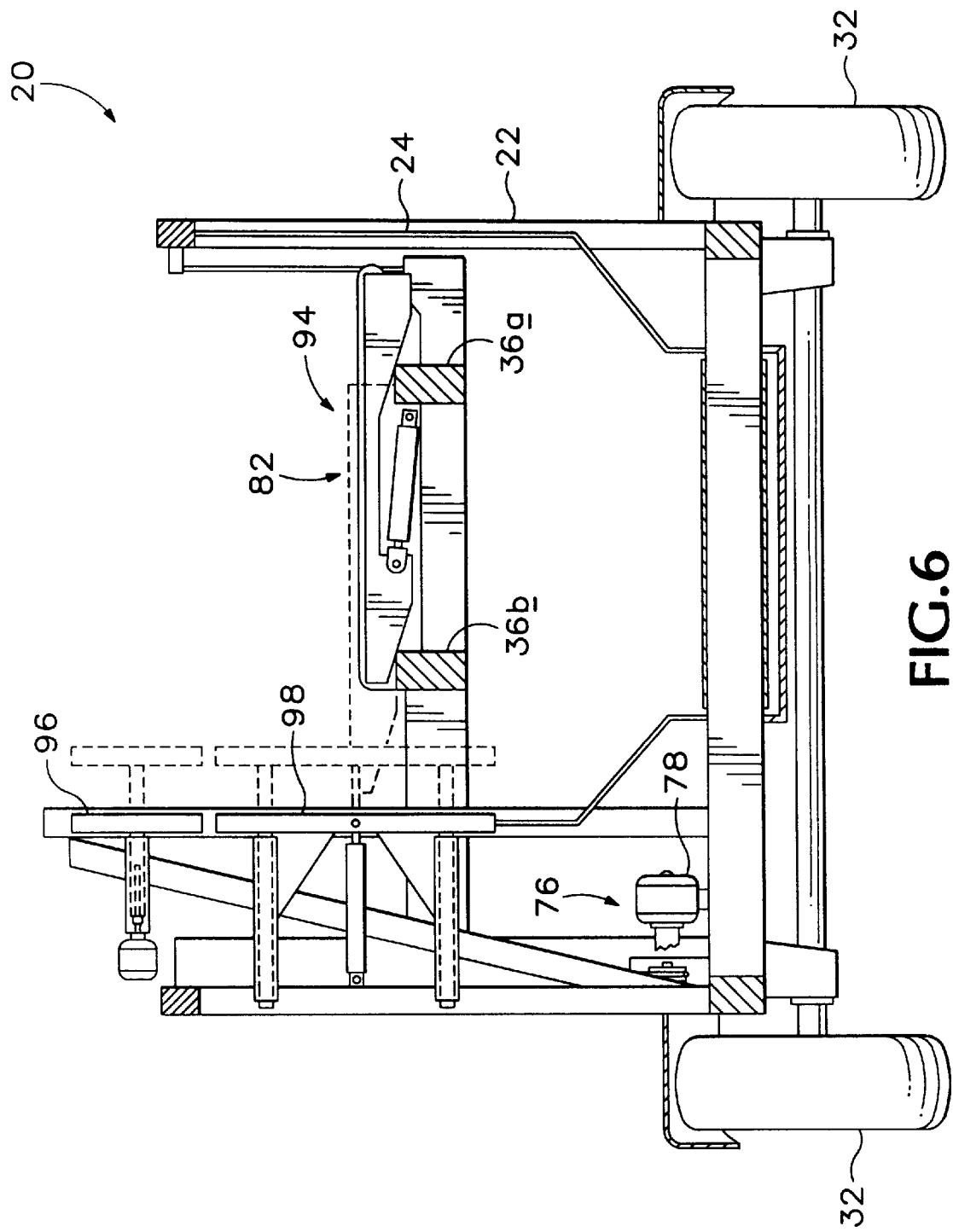
FIG. 6 is a rear cross-sectional view of the apparatus taken generally along the lines 6—6 in FIG. 2B.

Turning next to FIG. 6, a hydraulic cylinder-driven extender arm is indicated generally at 94. It will be appreciated that there preferably are provided in apparatus 20 plural, e.g. six, instances of such an extender aim 94 in the positions indicated in FIGS. 2A and 2B, each being identical and thus identically designated. Those of skill in the art will appreciate, however, that because each is cylinder driven, the plural extender arms 94 may be selectively operated as a group to extend and elevate the log support region effectively, temporarily to close the throat of lift mechanism 36 in order to extend the lateral reach thereof (as indicated in phantom) and to enable apparatus 20 to convey a cant toward support arms 58, 60, 62, 64, 66, 68, 69 (none of which shown in FIG. 6, for the sake of clarity).

Also shown in FIG. 6 is a feature complementary to the horizontal taper block shown in FIG. 5. It will be appreciated that, in order to spindle-align a log on support region 82 of apparatus 20, it may be necessary also to rotate the log slightly in the plane of support region 82, thereby to align the log in two orthogonal axes with the longitudinal axis of apparatus 20. Accordingly, preferably there are provided one or more vertical taper block sets, each preferably including an upper and a lower vertical taper block 96, 98 independently hydraulic cylinder driven to engage the log laterally, selectively to rotate the log in the generally horizontal plane of support region 82. In accordance with the preferred embodiment of the invention, vertical taper blocks 96, 98 have a throw of approximately 8", as indicated in phantom. It will be appreciated that one or more suitably arranged vertical taper block sets may be stationed at desired intervals along the longitudinal axis of apparatus 20.

Figure 7:
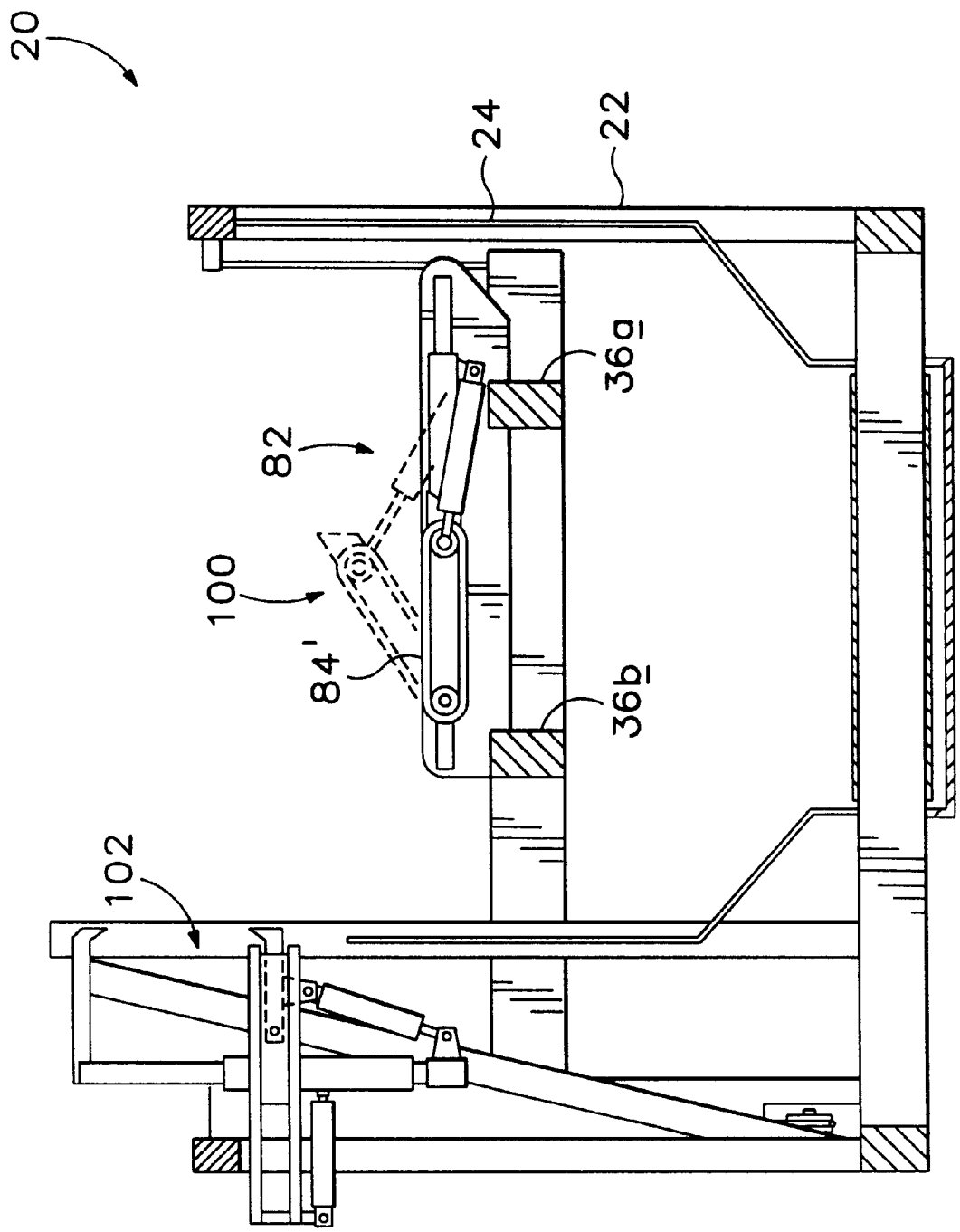
FIG. 7 is a rear cross-sectional view of the apparatus taken generally along the lines 7—7 in FIG. 2A.

Turning to FIG. 7, two additional features of invented apparatus 20 may be seen. The first illustrated feature is a kick-and-roll mechanism 100 including a shorter lateral chain conveyor 84' that is configured for being rotated pivotally (as indicated in phantom) by a hydraulic cylinder. Those of skill will appreciate that one or more such kick-and-roll mechanisms may be activated to urge a log or cant supported by lift mechanism 36 toward the side-wall of apparatus 20, and to impart a spin to the log or cant, thus providing for its lateral positioning and radial orientation (about its long axis). In accordance with the preferred embodiment of the invention, apparatus 20 includes two such kick-and-roll mechanisms, one stationed between retractable support arms 62, 64 and one stationed between retractable support arms 66, 68 (refer briefly to FIGS. 2A, 2B).

The other illustrated feature of FIG. 7 is a cant-dogging mechanism 102 including a lower jaw member pivotable by a pneumatic cylinder into closer proximity with an opposing, upper jaw member. Those of skill will appreciate that cant-dogging mechanism 102 may be activated to pinch and control a cant C perched on the retractable support arms (refer briefly to FIG. 16). Brief reference to FIGS. 2A, 2B shows that plural ones of, e.g. six, such stations preferably are provided in apparatus 20 in its preferred embodiment. Those of skill will appreciate that the cant-dogging mechanisms may be greater or fewer in number and that they may be positioned differently, within the spirit and scope of the invention.

Figure 8:
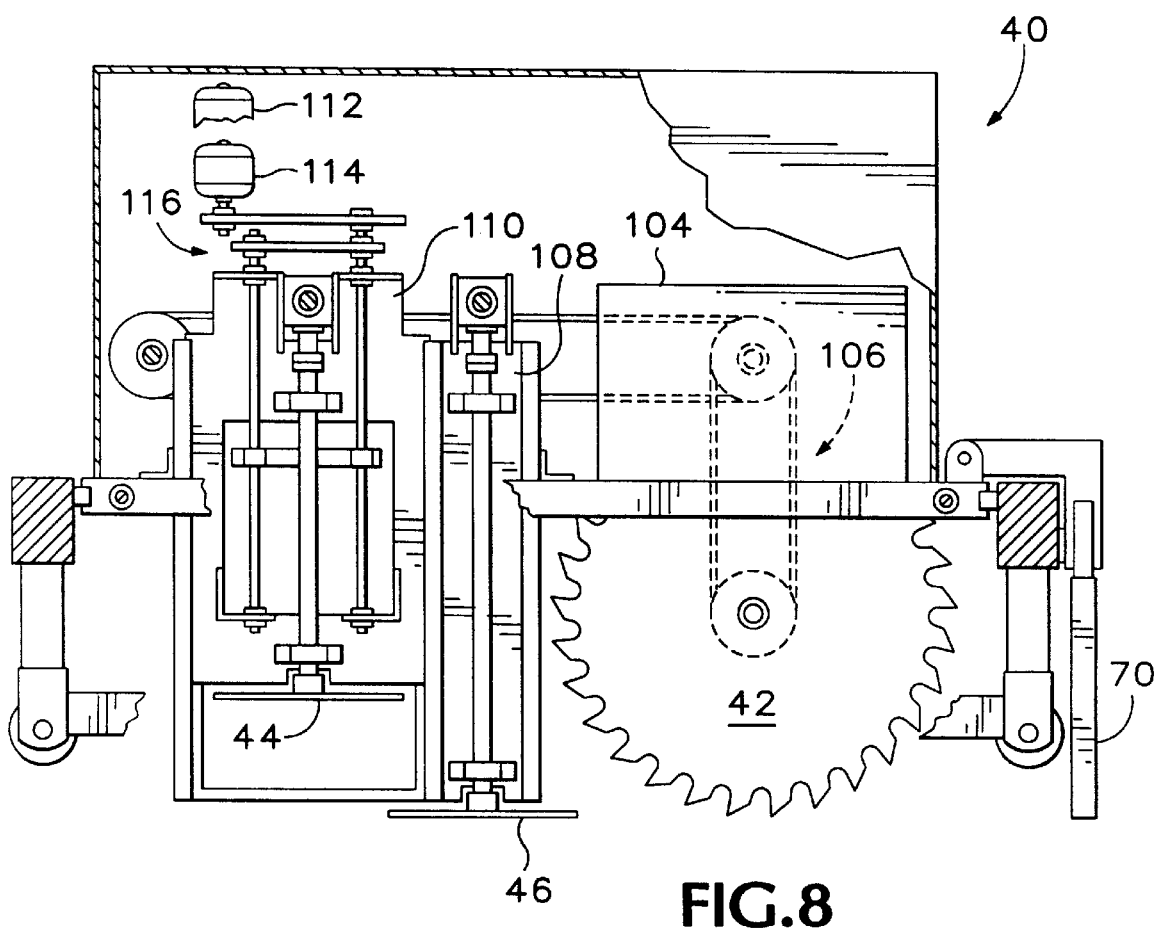
FIG. 8 is an enlarged and more detailed cross-sectional side elevation of the apparatus' main carriage corresponding with FIG. 1B.

FIG. 8 illustrates in fragmentary cross-sectional lateral view the way in which the three rotary saw blades 42, 44, 46 are configured and mounted relative to secondary carriage 40. An engine is indicated at 104 as being mounted on second carriage 40 directly above first saw blade 42, with a belt drive mechanism therebetween indicated generally at 106. Engine 104 preferably is a fueled internal combustion engine, e.g. a diesel, but may be any suitable rotary power source, within the spirit and scope of the invention.

Figure 9A:
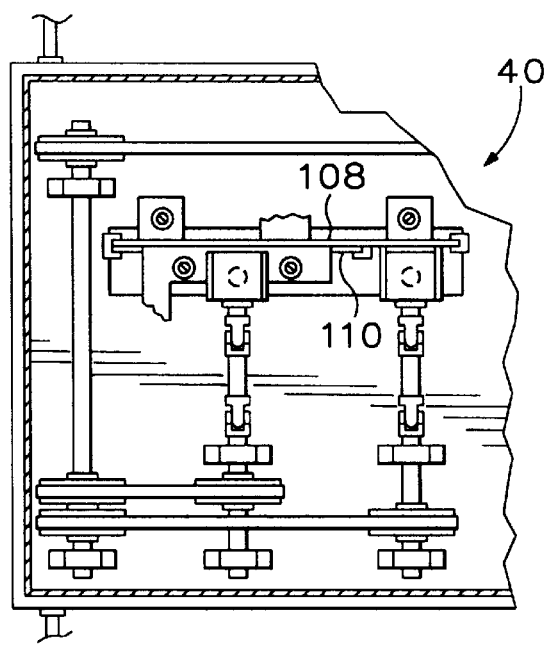
FIGS. 9 and 9A represent enlarged and more detailed cross-sectional top plan views of the apparatus' main carriage corresponding with FIG. 2B, wherein FIG. 9A reveals the horizontal saw drive trains by sectioning behind the drive motors and chain-and-sprocket linkages.

Second and third saw blades 44, 46 (in edge view in FIG. 8) are seen from FIGS. 8 and 9A to be also belt driven by engine 104 and associated, journal-mounted drive shafts and axles to be understood readily by those skilled in the art by reference to FIG. 9A. In FIG. 8, it may be seen that second and third saw blades 44, 46 are mounted for independent height adjustment on cooperative slides 108, 110 that are driven up and down by separate pneumatic motors 112, 114 and an associated chain-and-sprocket and quadruple worm screw drive mechanism 116 (two worm screws being operated by motor 112 and the other two worm screws being operated by motor 114, as illustrated in FIG. 8). It will be appreciated from FIGS. 8, 9A that slides 108, 110 operate independently from one another by virtue of their separate drive motors and worm screw pairs, and that one slide effectively slidably mounts the other such that second and third saw blades 44, 46 may be raised and lowered together by operating motor 112 while second saw blade 44 may be raised and lowered relative to third saw blade 46 by operating motor 114.

Those skilled in the art will appreciate the importance of having independently height-adjustable, plural horizontal saw blades. In the operation of apparatus 20 suggested by FIGS. 14 through 16 to be described below, one or more concurrent horizontal ripping operations may be performed in a single pass of main carriage 26, whether processing a log L or a cant C resting on lateral chain conveyors 84, 84' or on retractable support mechanism 56. Importantly, the concurrently produced horizontal cuts may vary in vertical distance therebetween by varying the elevation between second and third saw blades 44, 46. Thus, a plurality of ⅞", 2", 4", 6" or even up to 14" wide lumber may be produced depending upon the desired yield from log L or cant C without the need between passes to change the relative heights of the two horizontal saw blades.

Figure 9:
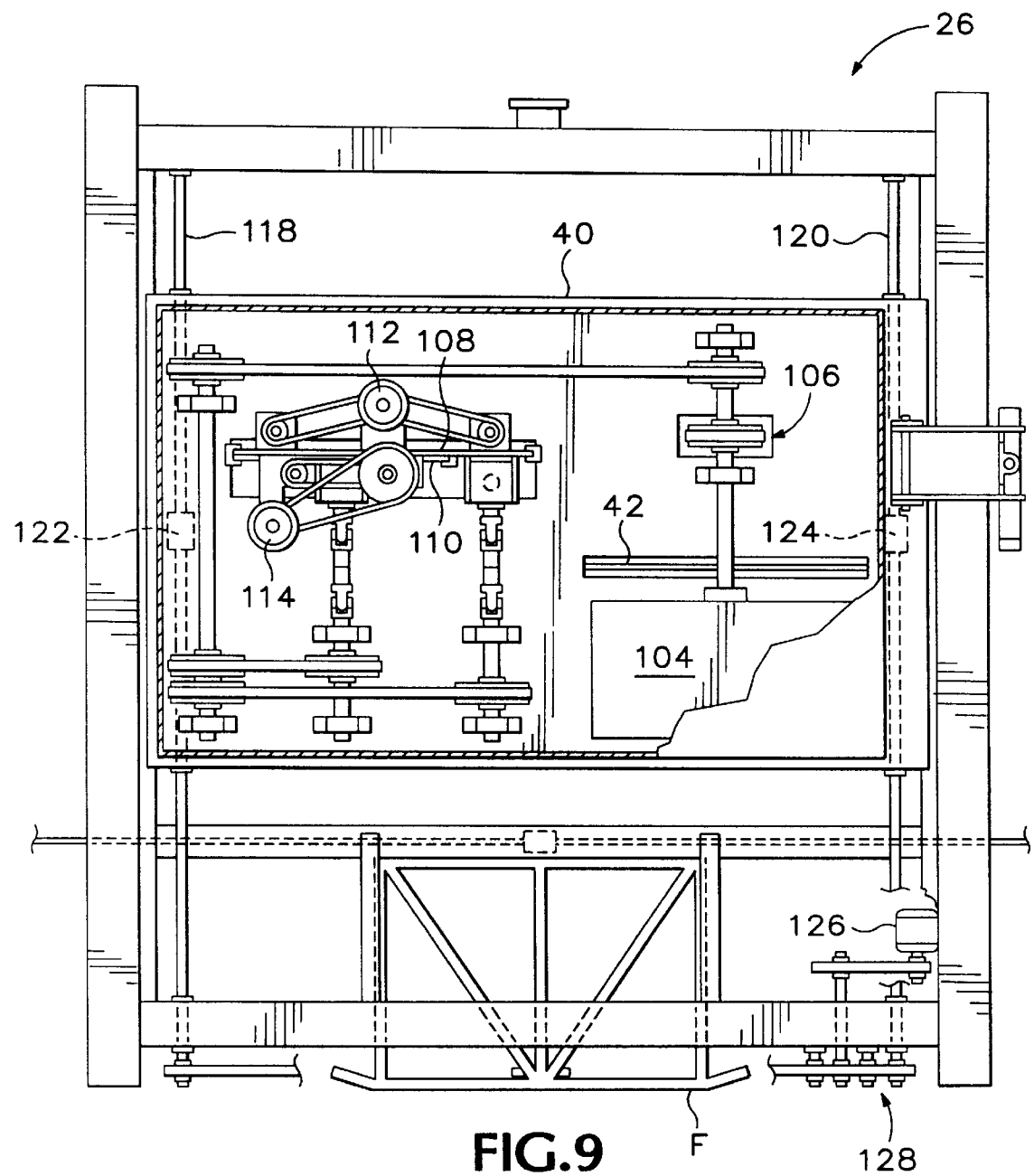

FIG. 9 is a top plan view corresponding generally with FIG. 8, but showing main carriage 26 and how it reciprocally mounts secondary carriage 40. First, it is noted that FIG. 9 shows in top plan view of main carriage 26 the way in which elevator slides 108, 110 are powered by motors 112, 114. Importantly, FIG. 9 also shows that secondary carriage 40 is reciprocated laterally by the use of a pair of worm screws 118, 120 mounted for rotation on main carriage 26, wherein worm screws 118, 120 are threaded through corresponding collars 122, 124 fixedly mounted to secondary carriage 40. A pneumatic motor 126 drives the worm screws via an associated chain-and-sprocket drive mechanism indicated generally at 128.

Referring briefly to FIG. 9A, a fragmentary, detailed top plan view corresponding with FIG. 9, it may be seen that, underneath the drive motors and chained sprockets that power the horizontal saw blade elevator slide mechanisms, the worm screws that actually elevate the slides are visible. It also may be seen in FIGS. 9, 9A that twin pairs of universal joints (U-joints) couple the saw blade drive trains to the corner gear blocks (indicated schematically by rectangles containing dashed circles), with a telescoping joint (indicated schematically by a transverse mid-line) in the member between each corresponding U-joint. It will be appreciated that the telescoping configuration of the drive axles permits the rotary saw blades to be powered by the diesel engine at whatever elevation they are positioned by the elevator slide mechanism.

Referring collectively to FIGS. 10A, 10B through 16, the operation of invented apparatus 20 now will be described in somewhat schematic phase diagrams. It will be appreciated that the diagrams represent top plan and front elevational views of the apparatus similar to that of FIGS. 2A, 2B and 3, but have certain detail intentionally omitted for the sake of clarity in operation of apparatus 20.

Figure 10A:
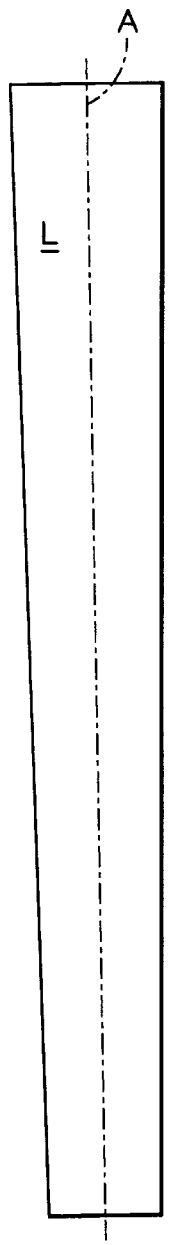
FIGS. 10A and 10B represent a simplified, schematic top plan view of the apparatus showing a first phase of its operation in which a log is laterally positioned for milling by vertical taper blocks.
Figure 10B:
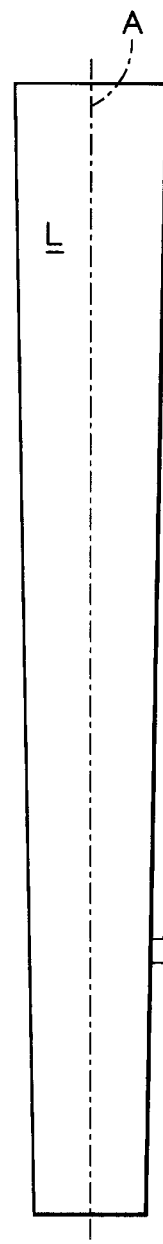

Referring first and collectively to FIGS. 10A, 10B, 11A and 11B, it may be understood how a log may be spindle-aligned in preparation for milling for optimal lumber yield therefrom. FIGS. 10A, 10B schematically illustrate how a log L is adjusted rotationally in a horizontal plane on support region 82 of apparatus 20 by extending one or more of the vertical taper block pairs 96, 98 to urge one or the other ends of log L laterally. It will be appreciated that such may be laser beam-assisted, as is known, to ensure proper alignment of the central longitudinal axis A (indicated as a dash-dotted line) with the long axis of apparatus 20. FIG. 10A may be thought to illustrate log L before such rotational adjustment and FIG. 10B may be seen to illustrate log L after such rotational adjustment.

Figure 11A:
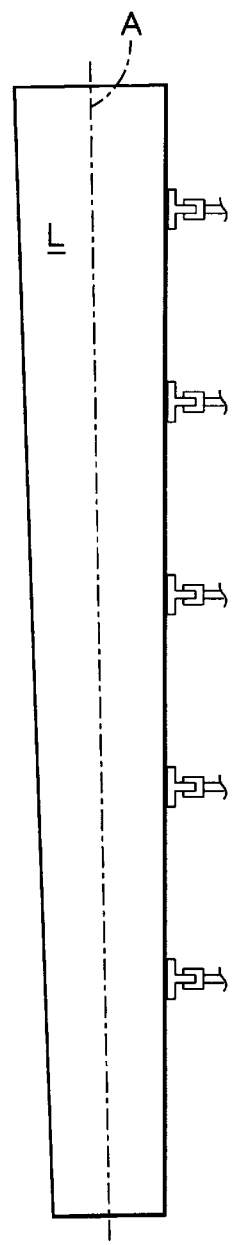
FIGS. 11A and 11B represent a simplified, schematic side elevation of the apparatus showing a second phase of operation in which the log is horizontally positioned for milling by horizontal taper blocks.
Figure 11B:
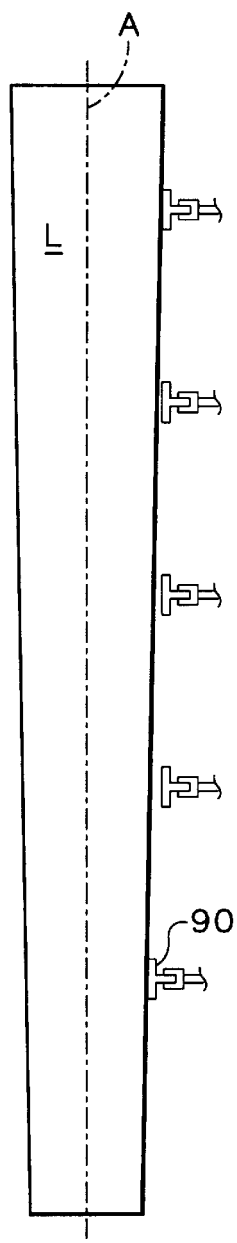

Turning briefly next to FIGS. 11A and 11B, it may be seen that log L similarly may be spindle-centered within apparatus 20 in a vertical plane by extending one or more of horizontal taper blocks 90 to urge one end (typically the narrower or tapered end) of log L upwardly, thereby to align its central, longitudinal axis A with the long axis of apparatus 20. Those of skill in the art will appreciate that by the rotational alignment of log L in two orthogonal planes, its long axis A may be aligned with a central longitudinal axis of apparatus 20 representing the intersection of a horizontal and vertical plane along which axis the saw blades travel in a log- or cant-ripping operation.

Figure 12:
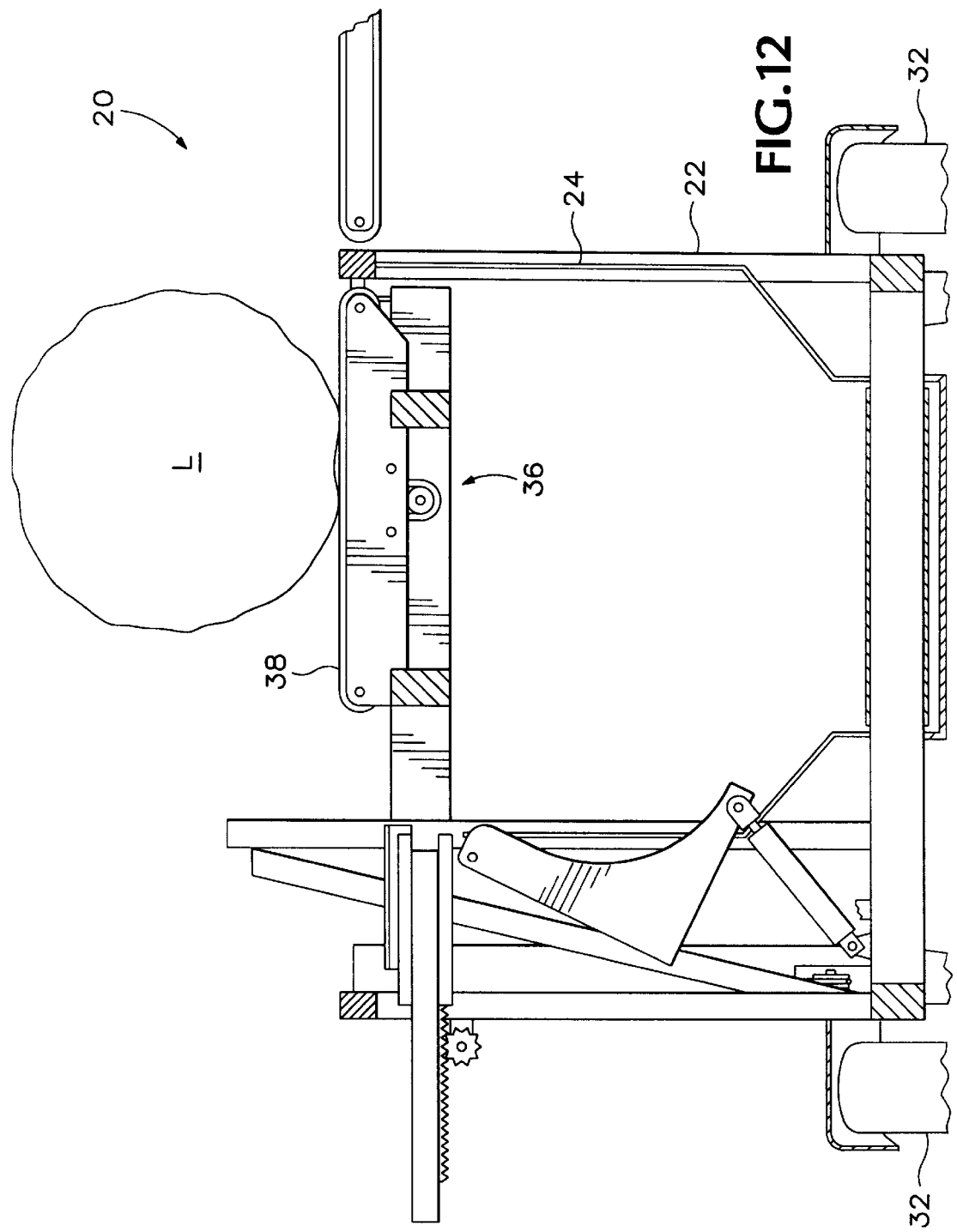
FIG. 12 is a rear elevation of the apparatus showing a third phase of operation in which a log is conveyed onto the lift mechanism in preparation for milling.

Turning first to FIG. 12, a third phase of operation of apparatus 20 is illustrated in which a log L is conveyed onto log support or lift mechanism 36 and laterally positioned by lateral conveyor 38 in preparation for making a first pass of main carriage 26 (not shown). It may be seen from FIG. 12 that log L preferably is positioned with its long central axis substantially aligned with the long axis of frame 22 to maximize lumber yield therefrom. Such may be accomplished in any suitable fashion, e.g. manually, but preferably is accomplished as described above by reference to FIGS. 10A, 10B, 11A and 11B. It may also be seen that lift mechanism 36 has been operated semi-automatically, rather than manually, to elevate log L to a desired height beneath secondary carriage 40 (also not shown in FIG. 12, but shown in FIG. 13) such that log L is positioned for a first pass of main carriage 26.

Figure 13:
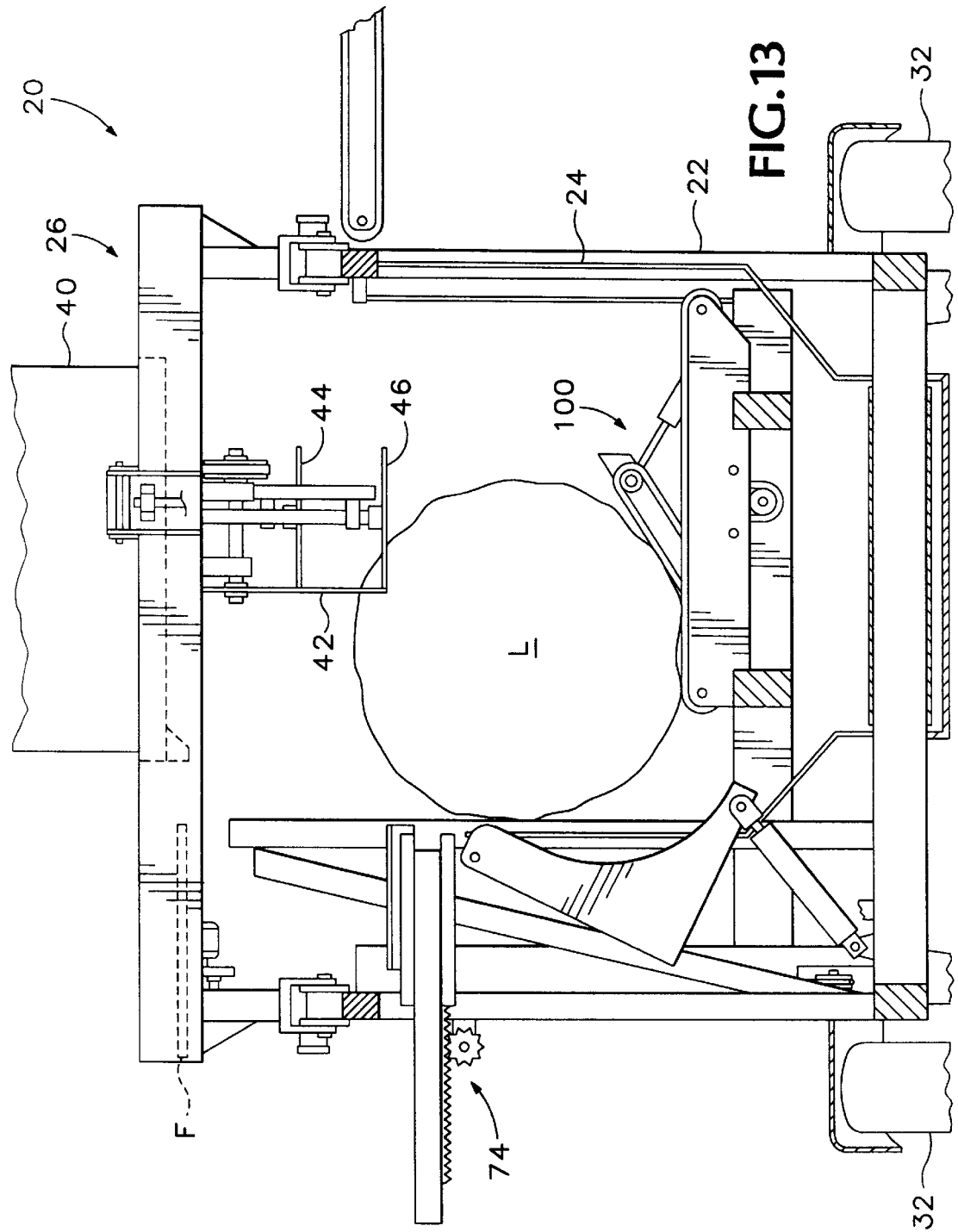
FIG. 13 is a rear elevation of the apparatus showing a fourth phase of operation in which the lift mechanism is lowered and the log supported thereon is rotated and laterally moved into position for milling.

Turning briefly to FIG. 13, it may be seen that log L has been moved or rolled laterally by the use kick-and-roll mechanism 100 into a vertical member near the sidewall of frame 22. Log L will be seen to be positioned now within reach of horizontal saw blade 46 and vertical saw blade 42 for a first ripping pass of main carriage 26, by the illustrated lateral positioning of secondary carriage 40. The first and second such passes typically are used to remove and discard unusable rounds, thus to square log L as shown in FIG. 14.

Figure 14:
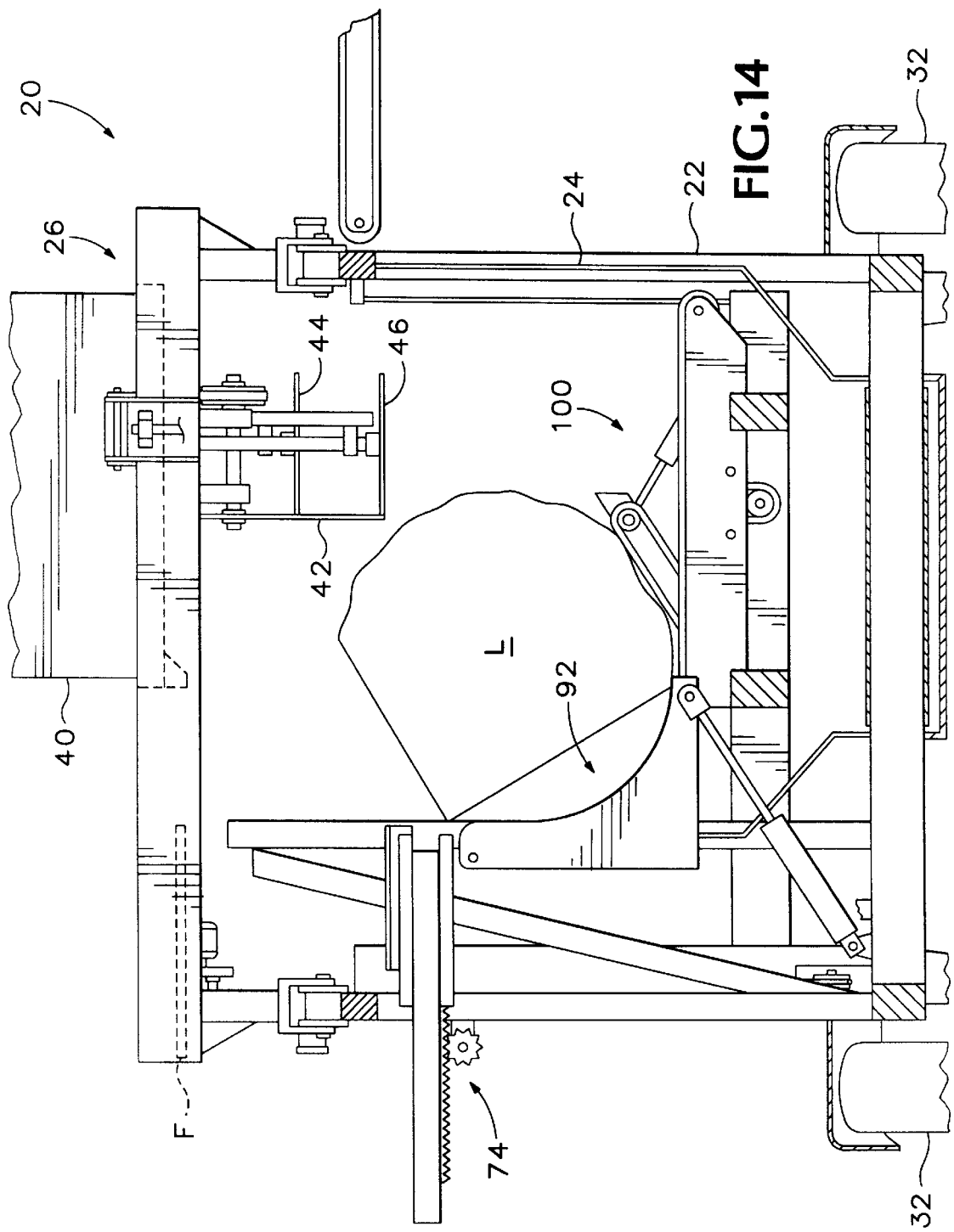
FIG. 14 is a rear elevation of the apparatus showing a fifth phase of its operation in which the partly squared log is rotated by the invented milling apparatus.

Turning briefly to FIG. 14, a fifth phase of operation of apparatus 20 may be understood to involve a first vertical and a first horizontal cut that has produced two discardable rounds and that has produced a partly squared log L. It also may be seen that partly squared log L has been rotated approximately thirty-five degrees counterclockwise to illustrate the way in which kick-and-roll mechanism 100 and knee block 92 cooperate in the smooth, semi-automatic handling of partly milled logs within invented apparatus 20.

Figure 15:
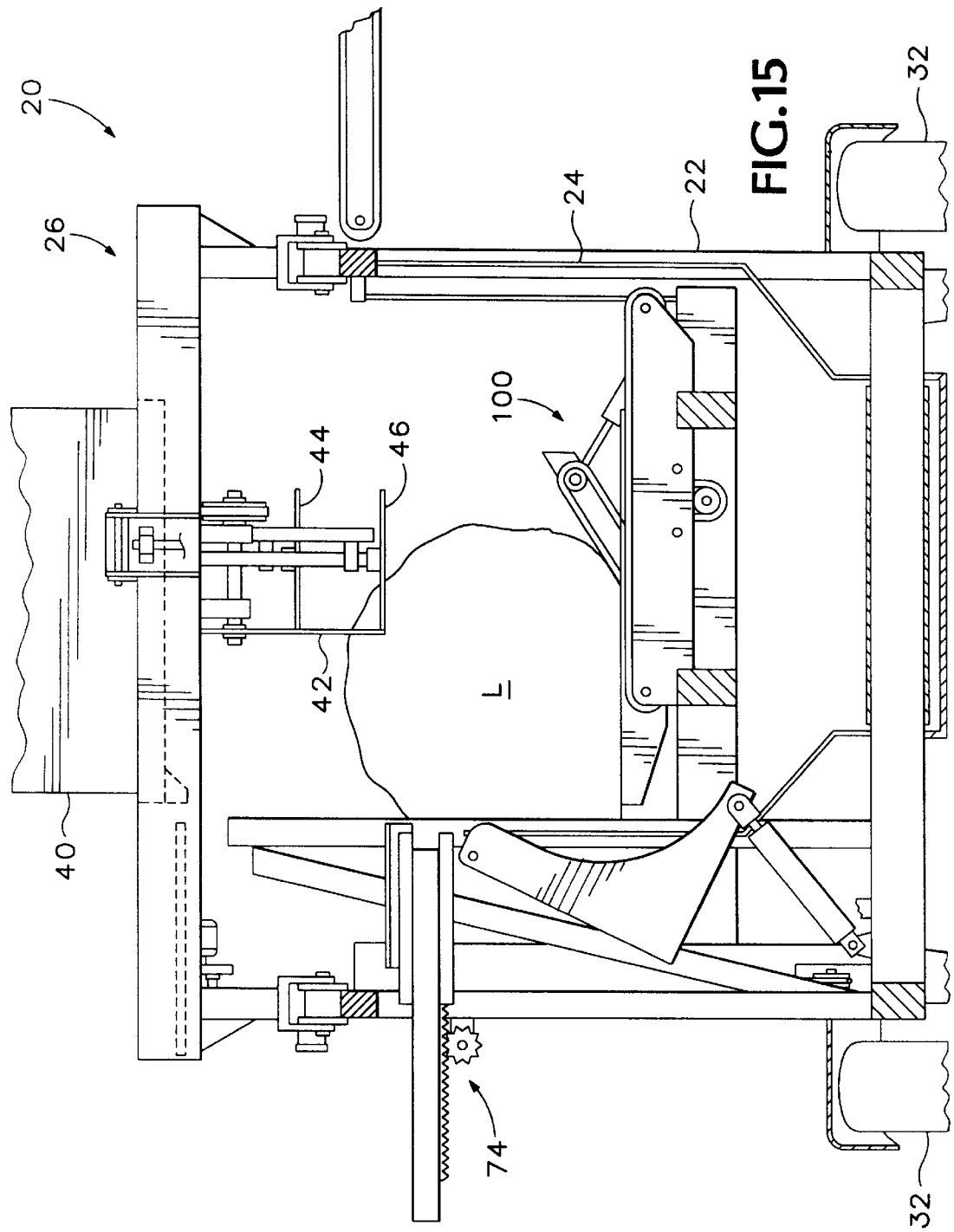
FIG. 15 is a rear elevation of the apparatus showing a sixth phase of operation in which the log is in position for further squaring.

Turning next to FIG. 15, in which partly squared log L has been further rotated counter-clockwise approximately fifty-five degrees, secondary carriage 40 may be seen to have been positioned laterally such that a third squaring vertical cut may be produced along the top rounded edge of log L by first and second saw blades 42, 46. Lower horizontal saw blade 46 may be seen to have been positioned elevationally such that a squaring horizontal cut may be produced along the upper rounded edge of log L. The result of a single or multiple longitudinal passes (e.g. one taken from either side of the log's vertical centerline) of main carriage 26 may be seen by reference to FIG. 16.

Figure 16:
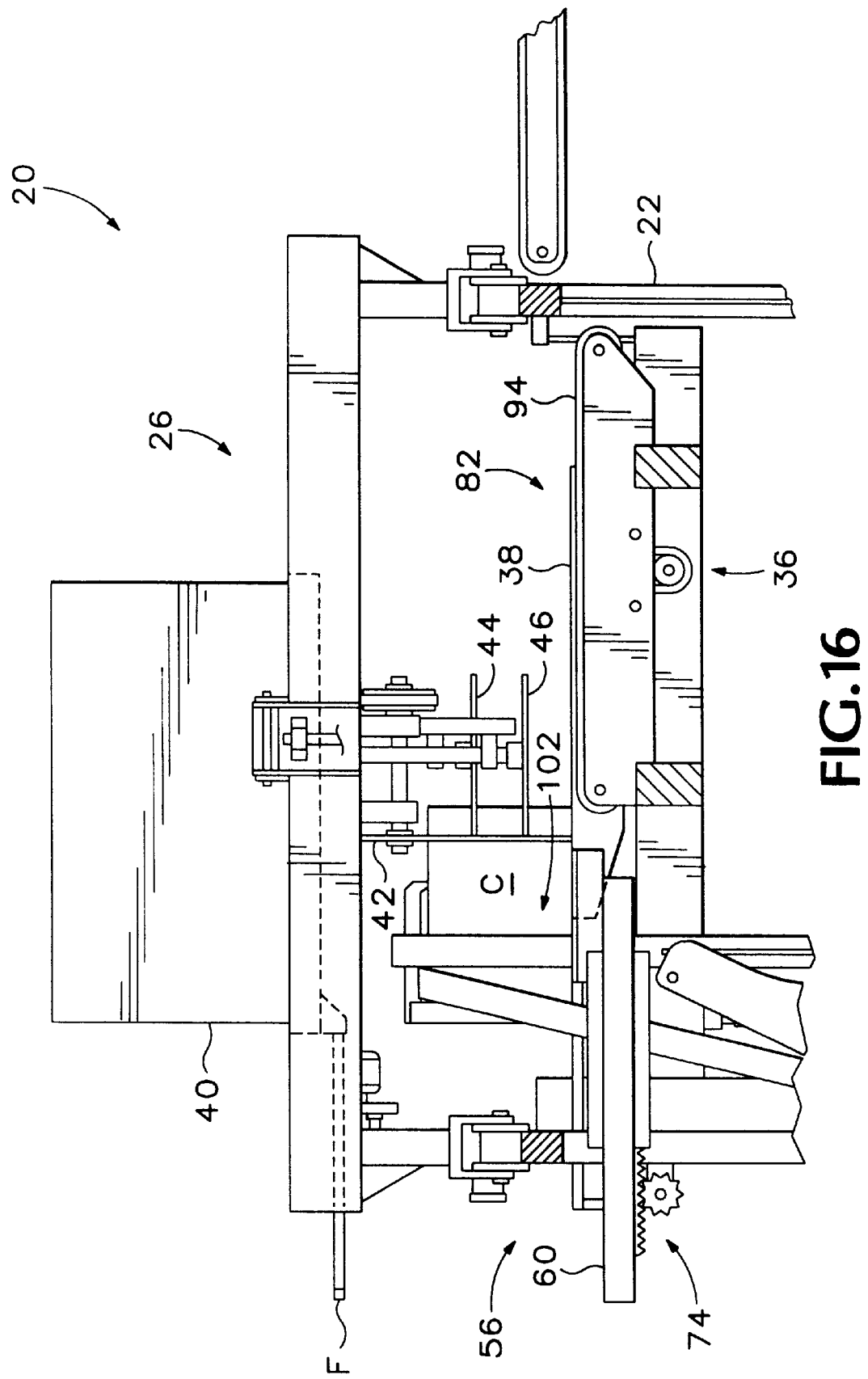
FIG. 16 is a rear elevation of the apparatus showing a seventh phase of operation in which the fully squared cant is elevated by the extendable lift mechanism, conveyed onto the retractable support mechanism and grasped by the cant-dogging mechanism in preparation for finished lumber milling.

Referring briefly now to FIG. 16, fully squared cant C has been elevated by lift mechanism 36 and conveyed laterally by one or more conveyors 38 and/or extender arms 94 onto retractable support mechanism 56. Cant C may be seen to be grasped by cant-dogging mechanism 102 and is securely positioned for final milling passes of main carriage 26.

Referring still to FIG. 16, a second vertical and two horizontal cuts are contemplated that will produce, for example, two cross-grain 3"×5"s and a flat-grain 3"×5", leaving a cant C that requires further processing. Those of skill in the art will appreciate that further similar or differently dimensioned milling passes would follow that would complete the final milling of cant C supported on retractable support mechanism 56.

Importantly, it may be seen in FIG. 16 that the cant support arms such as arm 60 of retractable cant support mechanism 56 are fully extended in preparation for the conveyance of cant C from log support or lift mechanism 36 to cant support mechanism 56. Those of skill in the art will appreciate that by fully extending the cant support arms into close proximity with the terminal edge of lift mechanism 36, and by actuating lateral conveyor 38 and/or extender arm 94, cant C will be transferred fully onto cant support mechanism 56, which then may be synchronously retracted outwardly from the interior of frame 22 as successive passes of main carriage 26 further process the cant.

Summarizing, a key feature of the invention may be seen to be the ability to retract cant support mechanism 56 in synchronization with the lateral progression of second carriage 40 as the cant supported thereon is processed. In accordance with the preferred embodiment of the invention, an electromechanical sensor such as trip-switch S (see FIGS. 2B, 3) activates a drive mechanism to slidingly retract horizontally extending support arms 58, 60, 62, 64, 66, 68, 69 in unison outwardly from the interior region of tub 24 and safely away from primary saw blade 42. This automatically enables primary saw blade 42 to continue ripping the supported cant without interference with cant support mechanism 56.

Those of skill in the art will appreciate also that vertical taper blocks 96, 98 may also be used—during the milling of cant C while it is supported on retractable support mechanism 56—whereby one or both or the upper and lower blocks at each station operated in unison is extended to urge a squared cant C away from the vertical members that form the sidewall of the interior central region of frame 22 up to 2", thereby to provide ripping margin for second and third, horizontal saw blades 44, 46 for finished horizontal ripping of the cant.

Referring still then to FIG. 16, it will be understood that the retractable support arms of cant support mechanism 56 automatically would be retracted by actuation of the rack-and-pinion drives operatively connected therewith as secondary carriage 40 moves to the left, and one or both vertical taper blocks 96, 98 may urge cant C in the opposite direction of such cant support mechanism retraction, such that partly processed cant C is positioned for a final vertical cut by first saw blade 42 and second and third saw blades 44, 46. It will be appreciated that such a final cut might produce two or three additional pieces of lumber, as desired to meet yield criteria.

Importantly, the support arms of retractable cant support mechanism 56 are automatically retracted to a position clear of first saw blade 42, as may be seen in FIG. 16. Such is accomplished in accordance with invention by the use of frame-mounted limit switch S and its cooperation with a spring-returned fence F urged toward switch S by secondary carriage 40. Such retraction of the support aims is synchronous with lateral movement of the lateral carriage (leftward in FIG. 16) and automatic, thus protecting the support arms while enabling final ripping cuts to be made to partly processed cant C.

It will be appreciated, once again by reference to FIG. 16, that any by-product such as sawdust or discardable pieces of lumber have fallen into tub 24, out of the way of further log processing, or, optionally and within the spirit and scope of the invention, onto a debris conveyor near the bottom thereof for discard out the front end of apparatus 20. It will also be appreciated that the lumber produced by the ripping operations illustrated in FIGS. 12, 13 and 16 are removed from apparatus 20 via a frontal exit support region 72 by gate 70. Thus, a next log may be loaded onto lift mechanism 36 as before and the operation may continue without delay. It is noted that the elevation of lift mechanism 36 may be adjusted upwardly or downwardly to accommodate a smaller or larger log. It will be appreciated that invented apparatus 20 can accommodate a wide variety of log diameters and lengths, thus rendering it extremely versatile.

Referring back briefly now to FIGS. 1A, 1B, 2A and 2B it may be understood that frame 22 mounts main, wheel-equipped carriage 26 on a pair of smooth elongate tracks 130, 132 for reciprocation by drive mechanism 28 including preferably a second winch mechanism indicated generally at 134 that includes a cable 136, a drive and an idle pulley 138, 140, respectively and a common, preferably hydraulic motor 142. On either end of either track may be seen preferably to be provided two pairs of shock absorbers 144, 146, 148, 150 for controlling terminal motion of main carriage 26 in the event of a temporary loss of control of drive motor 142. Finally, shown best in FIG. 2A is a pneumatic motor 152 and a drive shaft 154 that selectively operate to retract and extend cant support mechanism 56 via its support arm' rack-and-pinion drives described above.

Method of Use of the Invented Device

When the mill is in use, the operator loads a log into tub 24 from a lateral conveyor, which may be operatively connected to a conventional and preferably portable debarker (not shown). The log is spindle-aligned by the use of the horizontal and vertical taper blocks and the diameter is estimated by an operator of apparatus 20. Starting positions for lift mechanism 36, second carriage 40, and first and second edger saw blades 44, 46 are set independently from one another optionally with computer utilization to maximize yield from the log based upon any desirable yield criteria. Next, the operator activates main carriage 26, with the saw blades rotating, and main carriage 26 advances the saw blades longitudinally proximate the log to make a first series of vertical and/or horizontal cuts.

The log then may be rotated, for example, onto a planar surface produced by a first pass and/or subsequent passes of main carriage 26, with the cut-and-separated round piece (not useful as lumber, typically) being ejected out the far end of tub 24 for trimming to produce firewood or for chipping to produce by-products. Further processing may produce further horizontal and vertical cuts, thereby substantially effectively squaring the log for further passes to produce finished lumber for trimming, preferably such finished lumber milling being performed while the square cant is supported on the retractable support mechanism and optionally held in place by the illustrated cantdogging mechanisms. Such further cuts may produce any desired mix of dimensional lumber, based upon customer order or maximum board foot yield or maximum dollar value yield from the log.

Accordingly, while the present invention has been shown and described with reference to the foregoing preferred device and method for its use, it will be apparent to those skilled in the art that other changes in form and detail may be made therein without departing from the spirit and scope of the invention as defined in the appended claims.

I claim:

1. Apparatus for milling lumber comprising:
   an elongate frame, in which said frame includes a sidewall;
   a first carriage mounted on said frame for longitudinal reciprocation therealong;
   a second carriage mounted on said first carriage, said second carriage being laterally movable relative to said first carriage;
   a first saw mounted on said second carriage for producing a first ripping cut along a log supported within said frame;
   a lift mechanism mounted within a base of said frame, said life mechanism being capable of elevating the log supported within said frame relative to said first saw;
   a retractable support mechanism mounted within the frame nominally above said lift mechanism, said support mechanism being capable of supporting a cant produced by a sawing operation, said support mechanism further being step-wise retractable in synchronization with lateral movement of said second carriage while the cant is further sawn by said first saw while supported by said support mechanism, wherein said support mechanism includes a plurality of support arms extending inwardly form said side-wall, with said plurality of support arms lying nominally in a plane that is substantially parallel with said lift mechanism, wherein said support arms are operatively coupled for simultaneous extension and retraction by a linear drive mechanism.

2. Apparatus for milling lumber comprising:
   an elongate frame, in which said frame includes a sidewall;
   a first carriage mounted on said frame for longitudinal reciprocation therealong;

a second carriage mounted on said first carriage, said second carriage being laterally movable relative to said first carriage;

a first saw mounted on said second carriage for producing a first ripping cut along a log supported within said frame;

a lift mechanism mounted within a base of said frame, said life mechanism being capable of elevating the log supported within said frame relative to said first saw;

a retractable support mechanism mounted within the frame nominally above said lift mechanism, said support mechanism being capable of supporting a cant produced by a sawing operation, said support mechanism further being step-wise retractable in synchronization with lateral movement of said second carriage while the cant is further sawn by said first saw while supported by said support mechanism, wherein said retractable support mechanism is extended and retracted by a rack-and-pinion drive system and wherein said drive system includes a limit switch for detecting proximity of said second carriage and for synchronizing such retraction with lateral movement of said second carriage.

3. Apparatus for milling lumber comprising:

an elongate frame;

a first carriage mounted on said frame for longitudinal reciprocation therealong;

a second carriage mounted on said first carriage, said second carriage being laterally movable relative to said first carriage;

a first saw mounted on said second carriage for producing a first ripping cut along a log supported within said frame;

a lift mechanism mounted within a base of said frame, said life mechanism being capable of elevating the log supported within said frame relative to said first saw;

a retractable support mechanism mounted within the frame nominally above said lift mechanism, said support mechanism being capable of supporting a cant produced by a sawing operation, said support mechanism further being step-wise retractable in synchronization with lateral movement of said second carriage while the cant is further sawn by said first saw while supported by said support mechanism;

a lateral conveyance mechanism operatively connected with said lift mechanism and said retractable support mechanism for laterally conveying the log from the lift mechanism onto the retractable support mechanism.

4. A mobile sawmill for a primary and a secondary breakdown of a log into lumber, the sawmill comprising:

a frame with wheels at a first end thereof and a trailer hitch at a second end thereof, said ends defining a longitudinal axis of said frame;

a main carriage connected movably to said frame and being substantially coextensive therewith to define a first and second end of said main carriage, said main carriage movement being along the longitudinal axis of said frame, said frame and said main carriage forming a processing enclosure for the log;

a secondary carriage connected movably to said main carriage, said secondary carriage movement being in a direction perpendicular to said longitudinal axis and parallel to said frame, the movement of said secondary carriage extending substantially to a first side of said frame;

a rotary motion power source mounted on said secondary carriage;

a vertical circular saw attached to said secondary carriage;

a pair of horizontal circular saws attached to said secondary carriage;

a drive mechanism connected between said circular saws and said power source;

a log support mechanism for holding the log during a primary breakdown phase of operation of said sawmill, said log support mechanism being located within said processing enclosure;

a cable-winch drive mechanism attached to said frame and connected to said log support mechanism, said cable-winch drive mechanism lifting said log support mechanism so that the log orientation relative to said circular saws in changeable between successive passes of said circular saws on said main carriage;

a retractable cant support mechanism that extends along said first side of said frame, said cant support mechanism supporting a portion of the log produced by said primary breakdown phase during said secondary breakdown phase of operation of said sawmill, said cant support mechanism including two or more inwardly extending support arms defining a plane generally parallel with the ground, said cant support mechanism further including one or more mechanical sensors and a rack-and-pinion drive system, with said sensors actuating the rack-and-pinion drive system to move said arms away from said circular saws as said circular saws pass said extending arms, said vertical circular saw and said horizontal circular saw cooperating to produce ripping cuts in a cant supported by said cant support mechanism;

an exit support region proximate one of said first and second ends of said retractable support mechanisms; and a gate movably connected with said main carriage for pushing finished cut-produced lumber into said exit support region of said sawmill.

5. The apparatus of claim 4, which further comprises a semi-cylindrical tub extending underneath and at least partly around said log support mechanism, said tub providing for the capture of by-product from said primary and said secondary breakdown phases of operation of said sawmill.

* * * * *